(12) United States Patent
Rappmann et al.

(10) Patent No.: US 7,960,474 B2
(45) Date of Patent: Jun. 14, 2011

(54) HIGH STRENGTH ADHESIVES WITH IMPACT PEEL STRENGTH

(75) Inventors: Klaus Rappmann, Weinheimer-Rittenweier (DE); Rainer Kohlstrung, Plankstadt (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 12/194,012

(22) Filed: Aug. 19, 2008

(65) Prior Publication Data

US 2009/0062411 A1 Mar. 5, 2009

Related U.S. Application Data

(63) Continuation of application No. PCT/EP2007/000771, filed on Jan. 30, 2007.

(30) Foreign Application Priority Data

Mar. 24, 2006 (DE) .................. 10 2006 014 190

(51) Int. Cl.
- C09J 121/00 (2006.01)
- C09J 153/00 (2006.01)
- C09J 153/02 (2006.01)
- C08L 53/00 (2006.01)

(52) U.S. Cl. ............... 525/99; 525/89; 525/90; 525/91; 525/92 F; 525/92 J; 525/92 H; 525/331.9; 525/332.5; 525/332.6; 524/425; 585/507

(58) Field of Classification Search ............. 525/89, 525/90, 91, 92 F, 92 J, 92 H, 99, 331.9, 332.5, 525/332.6, 333.1, 333.2; 585/507; 524/524
See application file for complete search history.

(56) References Cited

U.S. PATENT DOCUMENTS

| | | | | |
|---|---|---|---|---|
| 3,668,279 A * | 6/1972 | Loveless et al. | ............ | 525/267 |
| 4,480,062 A * | 10/1984 | Paeglis | ............ | 524/394 |
| 4,931,508 A * | 6/1990 | Tobing | ............ | 525/194 |
| 5,149,895 A * | 9/1992 | Coolbaugh et al. | ............ | 585/507 |
| 5,256,738 A * | 10/1993 | Chasser et al. | ............ | 525/330.9 |
| 5,340,112 A * | 8/1994 | Hamada et al. | ............ | 473/354 |
| 5,432,232 A * | 7/1995 | Hattori et al. | ............ | 525/99 |
| 5,576,388 A * | 11/1996 | St. Clair et al. | ............ | 525/99 |
| 5,760,135 A * | 6/1998 | Korpman et al. | ............ | 525/95 |
| 6,004,425 A * | 12/1999 | Born et al. | ............ | 156/333 |
| 6,303,684 B1 * | 10/2001 | Suzuki et al. | ............ | 524/502 |
| 2003/0181558 A1 * | 9/2003 | von Hellens | ............ | 524/394 |
| 2004/0044133 A1 * | 3/2004 | Ko et al. | ............ | 525/105 |
| 2004/0052951 A1 * | 3/2004 | Sauer et al. | ............ | 427/385.5 |
| 2004/0265560 A1 * | 12/2004 | Sauer et al. | ............ | 428/297.4 |

FOREIGN PATENT DOCUMENTS

| | | |
|---|---|---|
| EP | 0270318 A2 | 6/1988 |
| EP | 0308664 A1 | 3/1989 |
| EP | 0338965 A2 | 10/1989 |
| EP | 0441244 A1 | 8/1991 |
| EP | 0594598 A | 2/1993 |
| EP | 0559254 A1 | 9/1993 |
| EP | 0586451 A | 3/1994 |
| EP | 0943673 A1 | 9/1999 |
| JP | 2000313786 A | 11/2000 |
| JP | 2000319475 A | 11/2000 |
| WO | 9623040 A1 | 8/1996 |
| WO | 9903946 A1 | 1/1999 |
| WO | 0194492 A1 | 12/2001 |
| WO | 0248252 A1 | 6/2002 |
| WO | 0248255 A2 | 6/2002 |
| WO | 02070619 A1 | 9/2002 |

OTHER PUBLICATIONS

Armstrong et al. (Care and Repair of Advanced Composites, 2nd Edition, 2005 Society of Automotive Engineers, Inc.).*
Fink et al. (Reactive Polymers Fundamentals and Applications—A Concise Guide to Industrial Polymers 2005 William Andrew Publishing/Plastics Design Library).*
International Search Report dated Apr. 25, 2007 for Application No. PCT/EP2007/000771 (All references cited in the Search Report are listed above).

* cited by examiner

Primary Examiner — Vasu Jagannathan
Assistant Examiner — Mark S Kaucher
(74) Attorney, Agent, or Firm — Mary K. Cameron; Henkel Corporation

(57) ABSTRACT

A single-component high-temperature-curing reactive composition based on natural and/or synthetic elastomers having olefinic double bonds and on vulcanizing agents is provided. Such compositions contain at least one liquid polyene with a molecular weight between 400 and 80,000, preferably between 800 and 25,000; at least one block copolymer with at least one polyene block and at least one saturated block; and a vulcanizing system of sulfur and accelerators and/or quinone oximes, if applicable. Such high-temperature-curing reactive compositions are useful as single-component adhesives, sealant or coating compositions or sealing compounds in automobile body manufacture.

18 Claims, No Drawings

HIGH STRENGTH ADHESIVES WITH IMPACT PEEL STRENGTH

CROSS-REFERENCE TO RELATED APPLICATIONS

This application is a continuation under 35 USC Sections 365(c) and 120 of International Application No. PCT/EP2007/000771, filed 30 Jan. 2007 and published 4 Oct. 2007 as WO 2007/110119, which claims priority from German Application No. 102006014190.3, filed 24 Mar. 2006, each of which is incorporated herein by reference in its entirety.

FIELD OF THE INVENTION

The present invention relates to a single-component, high-temperature-curing reactive composition based on natural and/or synthetic olefinic elastomers containing double bonds and on vulcanizing agents as well as their use as a single-component adhesive, sealant, sealing compound or coating material in automobile manufacturing, in particular in automobile body manufacture.

DISCUSSION OF THE RELATED ART

In machine construction, automobile manufacturing or equipment construction, in particular in aircraft construction, rail vehicle construction or automobile manufacturing, the components and/or composite materials are to an increasing extent being joined with the help of adhesives. For structural bonding, high demands are made of the strength of the adhesive bond. High-strength and at the same time impact-resistant, peel-resistant and impact peel-resistant adhesives, which are used today for application in automobile body manufacture, have previously been known mainly based on epoxides and elastomer-modified epoxides and/or acrylates.

These high-temperature-curing reactive adhesives (frequently also formulated as hot-melt adhesives) for double-flanged seam bonding and/or overlapping bondings are applied to oiled sheet metal and joined in body shop assembly. Curing of the adhesives or sealants used here is performed later in the lacquer drying ovens. The glued and/or sealed parts pass first through cleaning, phosphating and dip-priming steps. The adhesives and/or sealants or sealing agents can be rinsed out of the adhesive joints by the treatment agents used in these steps. To prevent this, the adhesive agent, sealing agent or sealant is precured by means of precuring mechanisms, e.g., with induction heaters, body shop assembly ovens, infrared lamps, and/or is adjusted rheologically accordingly to survive the following pretreatment without being washed out. Additionally, weld spots may be used to reinforce the body parts. Curing of the adhesives occurs during passage through the downstream enamel ovens (for cathodic dip lacquer (CDL), fillers, top coats, etc.).

EP-A-0 308 664 discloses epoxide resin compositions containing an epoxy adduct of a carboxyl group-containing copolymer based on butadiene-acrylonitrile or similar butadiene copolymers as well as a reaction product of an elastomeric prepolymer that is soluble or dispersible in epoxide resins and has terminal isocyanate groups with a polyphenol or aminophenol and subsequent reaction of this adduct with an epoxide resin. In addition, these compositions may contain one or more epoxide resins. Furthermore, for curing for these compositions, amino-functional hardeners, polyaminoamides, polyphenols, polycarboxylic acids and their anhydrides or catalytic hardening agents and, if applicable, accelerators are proposed. It is stated that these compositions are suitable as adhesives having a high strength, high glass transition temperature, high peel strength, high impact strength or high crack propagation resistance, depending on the specific composition.

EP-A-338985 describes modified epoxide resins containing a liquid copolymer based on butadiene, a polar, ethylenically unsaturated comonomer and, if applicable, additional ethylenically unsaturated comonomers and also a reaction product of dihydroxy-terminated and/or diamino-terminated polyalkylene glycols and diisocyanates plus a monophenol, a mercapto alcohol or an aliphatic lactam. According to the teaching of this publication, these compositions may be used to flexibilize epoxide resins. In addition to the components mentioned above, these compositions should also contain epoxide resins and a hardener and/or accelerator. Such mixtures should be usable as adhesives, adhesive films, patches, matrix resins, lacquers or sealing compounds.

WO 01/94492 describes condensation products of cyclic carboxylic anhydrides of dicarboxylic acids, tricarboxylic anhydrides or tetracarboxylic anhydrides and difunctional polyamines, in particular polyoxyalkyleneamines as synthesis components for epoxide resin compositions. The condensation products based on tricarboxylic anhydrides or tetracarboxylic anhydrides are characterized by more than one imide group and [one] carboxyl group per molecule on the average. If applicable, condensation products of trifunctional or polyfunctional polyols and/or trifunctional or polyfunctional amino-terminated polymers and cyclic carboxylic anhydrides may also be present in the compositions. Additionally these compositions contain conventional rubber-modified epoxide resins and liquid and/or solid polyepoxide resins and conventional hardeners and accelerators and, if applicable, fillers and rheology adjuvants. It is proposed that these modified epoxide resin compositions should be used as impact-resistant, impact peel-resistant and peel-resistant adhesives in automobile manufacturing and in electronics, in particular since they should have very good impact and peel properties at very low temperatures and should ensure a very good corrosion resistance and resistance to aging of the adhesive bond.

JP 2000-313786 A describes an impact-resistant acrylic acid composition containing a (meth)acrylate polymer as component A and an elastomer-modified acrylate resin as component B. Component B should be present as a particulate material with an average particle size of 0.2 to 10 μm as the disperse phase, which is surrounded by a continuous phase of component A. The ratio of the volume of component A to the volume of component B should be 0.5 to 4, and at least part of component A should be chemically bonded to part of component B. It is stated that these resin compositions should have an improved impact strength with good resistance to aging at the same time.

Similarly, JP 2000-319475 A describes an impact-resistant resin composition of a (meth)acrylate copolymer component A and a modified polyurethane elastomer component B. The polyurethane elastomer component B here should be in the form of a discontinuous dispersed phase in the continuous phase A, whereby the disperse phase has a structure which [is subject to] microphase separation. Here again, at least part of component A should be chemically bonded to part of component B. It is proposed that an acrylate syrup C be polymerized onto it with shearing, so that phase separation follows. These resin compositions should have an improved impact strength without any negative effect on resistance to aging or weather resistance.

EP 0270318 A2 describes a modified composition for use as a structural adhesive. These adhesive compositions contain a liquid rubber having olefinically unsaturated terminal groups, which has been reacted with a monoisocyanate component. It is proposed that to produce this liquid elastomer, a carboxy-terminated polybutadiene or a polybutadiene-acrylonitrile or a polybutadiene-methacrylonitrile-styrene copolymer be reacted with glycidyl methacrylate and then the resulting secondary hydroxyl groups be reacted with monoisocyanate compounds. Liquid elastomers with olefinic terminal groups modified in this way are then mixed with olefinically unsaturated monomers selected from acrylic acid esters, acrylic acid, styrene, substituted styrene and free-radical initiators to provide a room temperature-curing structural adhesive. It is stated that such adhesive compositions have an improved resistance to aging and improved low-temperature properties in comparison with other structural adhesives based on acrylate monomers.

WO 02/070619 describes elastic (meth)acrylate adhesive compositions with a high elongation at break. According to this publication, the adhesive compositions should have at least one monofunctional (meth)acrylate monomer A, the homopolymer or copolymer of which has a glass transition temperature between 40° C. and 140° C. In addition, the composition should contain a monofunctional (meth)acrylate monomer B with the following structure:

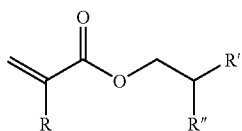

R herein denotes hydrogen or a methyl group, R' is hydrogen or $C_1$ to $C_3$ alkyl, in particular hydrogen or ethyl and R" denotes a $C_3$-$C_{20}$ alkyl group or a phenoxy group or an alkoxy group. As an additional component, an elastomer with a molecular weight range between 1000 and 9000 with (meth)acrylate groups should be present in the composition. This publication states that the compositions disclosed therein are particularly suitable for adhesive bonding of materials with different thermal expansion coefficients, such as those used in the automotive industry. Examples to be mentioned include adhesive bonding of side plates of trailers or direct glazing. It is stated that these compositions have a very high impact strength at low temperatures.

Disadvantages of the aforementioned adhesives based on epoxy or (meth)acrylate include:
  high cost of raw materials
  the code (usually with Xi)
  conditional oil uptake
  inadequate of corrosion protection
  inadequate resistance to aging.

High-strength adhesives based on rubber have also become known.

WO 96/23040 describes single-component, high-temperature-curing structural adhesives based on liquid rubbers, which may optionally contain functional groups in proportional amounts, solid rubbers, thermoplastic polymer powders and sulfur as well as vulcanizing accelerators. These are suitable for adhesive bonding of metal parts. Tensile shear strengths of more than 15 MPa may be obtained with a high elongation at break of more than 15% at the same time. These adhesives are essentially free of low-molecular epoxide resins and are in particular suitable for use in body shop assembly in the automotive industry.

WO 99/03946 discloses hot-pumpable, high-temperature-curing compositions based on ethylene-vinyl acetate copolymers (EVA) containing at least one solid EVA copolymer with a softening point of more than 50° C., measured according to the ring and ball method according to ASTM D 28, at least one liquid reactive plasticizer with olefinically unsaturated double bonds and at least one peroxidic crosslinking agent. According to the statements in this publication, these compositions are suitable as sealing agents for large and small seams in automobile manufacturing. With the use of blowing agents, these sealing agents may also be used as underlining adhesives. The preferred areas of use include body shop assembly in the production of automobiles.

WO 02/48252 discloses high-temperature-curing reactive compositions based on natural and/or synthetic elastomers that are based on liquid polyenes and have olefinic double bonds, and solid rubbers, if applicable. The vulcanizing system consists of sulfur and/or metal oxides and one or more organic accelerators which contain one or more heterocyclic compounds having at least two nitrogen atoms in the ring. These compositions can be vulcanized while avoiding and/or greatly reducing the odor burden due to sulfur and sulfur compounds. It is stated that these compositions are suitable as adhesives, sealants or coating compositions, in particular in automobile manufacturing.

WO 02/48255 discloses high-temperature-curing reactive compositions based on natural and/or synthetic liquid elastomers having olefinic double bonds and on vulcanizing agents which, in addition to traditional liquid polyenes, contain at least one liquid cis-1,4-polyisoprene with a molecular weight between 20,000 and 70,000 and a vulcanizing system of sulfur, accelerators and quinone oximes. These adhesives have a plastisol-like flow behavior, so they can be applied with traditional spray equipment at room temperature. It is stated that these compositions are suitable as seam sealants and sealing compounds, as underlining adhesives and as structural adhesives, e.g., as double-flanged seam adhesive.

The high-strength adhesives based on rubber of the state of the art cited above have the disadvantage, however, that they do not have any impact strength properties, in particular at low temperatures, because they become embrittled at low temperatures in particular, presumably due to the high degree of crosslinking.

The object of the present invention was therefore to provide high-strength and at the same time impact-resistant, peel-resistant and impact peel-resistant adhesives that can be used for application in automobile body manufacture and do not contain epoxide resins or (meth)acrylate resins as an essential ingredient.

BRIEF SUMMARY OF THE INVENTION

The present invention provides a single-component high-temperature-curing reactive composition based on natural and/or synthetic elastomers having olefinic double bonds and on vulcanizing agents, which contains
 a) at least one liquid polyene with a molecular weight between 400 and 80,000, preferably between 800 and 25,000;
 b) at least one block copolymer with at least one polyene block and at least one saturated block; and
 c) a vulcanizing system of sulfur and accelerators and/or quinone oximes, if applicable.

In a preferred embodiment, the saturated block of the block copolymer b) has a glass transition temperature of less than –30° C.

Another subject matter of the present invention is the use of the aforementioned high-temperature-curing reactive compositions as a single-component adhesive, sealant or coating composition or sealing compound in automobile body manufacture.

DETAILED DESCRIPTION OF CERTAIN EMBODIMENTS OF THE INVENTION

The liquid polyene(s) or elastomers a) contain at least one olefinically unsaturated double bond per molecule. They may be selected from the following group of homopolymers and/or copolymers:

Polybutadienes, in particular the 1,3- or 1,2-polybutadienes, polybutenes, polyisobutylenes, 1,4- and 3,4-polyisoprenes, styrene-butadiene copolymers, butadiene-acrylonitrile copolymers, whereby one or more of these polymers may have terminal and/or (randomly distributed) side-chain functional groups. Examples of such functional groups include hydroxyl groups, amino groups, carboxyl groups, carboxylic anhydride groups or epoxy groups. The molecular weight of these liquid rubbers is typically less than 80,000 and more than 400, by preference between 800 and 25,000. The amount of liquid rubber in the total composition depends on the desired rheology of the uncured composition and the desired mechanical stiffness or strength of the composite and the acoustic damping properties of the fully cured composition. The amount of liquid rubber and/or elastomer normally varies between 2 and 55 weight percent of the total formulation. It has proven expedient here to use by preference mixtures of liquid rubbers of different molecular weights and different configurations with respect to the remaining double bonds. Furthermore, the copolymers used may be block copolymers as well as copolymers with a random distribution of comonomers. To achieve optimal adhesion to various substrates, a liquid rubber component with hydroxyl groups and/or anhydride groups is used in a proportional amount in the particularly preferred formulations.

In addition, the inventive adhesive composition may also contain an amount of solid rubbers. Suitable solid rubbers have a significantly higher molecular weight (MW=100,000 or more) in comparison with the liquid rubbers. Examples of suitable rubbers include polybutadiene, by preference with a large amount of cis-1,4-double bonds (typically more than 95%), styrene-butadiene rubber, butadiene-acrylonitrile rubber, synthetic or natural isoprene rubber, butyl rubber or polyurethane rubber. The amount of solid rubber may be up to 18% by weight, by preference between 0.5 and 15 weight % and especially by preference between 1.4 and 12% by weight.

The block copolymers b) may be block copolymers of the AB, ABA or BAB type, where A denotes the polyene block and B denotes the saturated block. The block copolymers b) may also contain more than three comonomer blocks A and B; for example, they may have an ABABA structure or higher-grade block structures. Graft copolymers may also be used as block copolymers b). The saturated block should have a glass transition temperature ($T_g$) below room temperature; the $T_g$ should by preference be lower than −30° C.

The saturated block of the block copolymer b) is by preference made of ethylene-propylene-diene units (EPDM), ethylene vinyl acetate units (EVA), polyether, polyester, polyamide, polyimide, polyurethane, polyacrylate, polystyrene copolymer units or units based on hydrogenated acrylonitrile-butadiene-styrene copolymers. Blocks of polyoxyalkylene, polydialkylsiloxane, polydiarylsiloxane, polyalkylarylsiloxane, polyether-modified polydimethylsiloxane, poly(ethylene-propylene), poly(ethylene-butylene) or polyisobutylene units, SEPS (styrene-ethylene-propylene-styrene), SEEPS (styrene-ethylene-ethylene-propylene-styrene) or SEBS (styrene-ethylene-butylene-styrene) copolymer units are especially preferred.

Specific examples of polyoxyalkylenes include polyoxyethylenes, polyoxypropylenes or polyoxybutylenes (polytetrahydrofurans) as well as copolymers of ethylene oxide, propylene oxide and/or tetrahydrofuran. In particular polydimethylsiloxanes, polydiethylsiloxanes or polydipropylsiloxanes may be used as the polydialkylsiloxane blocks, mainly polydiphenylsiloxanes may be used as the polydiarylsiloxanes, and polymethylphenylsiloxanes, polyethylphenylsiloxanes, polypropylphenylsiloxanes may be used as the polyalkylarylsiloxanes.

The unsaturated block of the block copolymer b) is made of polybutadiene, polyisoprene or butyl rubber units as well as copolymer units of butadiene and/or isoprene with styrene and/or acrylonitrile, or copolymer units of acrylic acid esters with dienes. The unsaturated block of the block copolymer has a molecular weight range from 800 to 15,000, by preference between 1200 and 9000 and the saturated block has a molecular weight range from 500 to 90,000, by preference between 1000 and 40,000. The (weight) ratio of unsaturated block to saturated block (the sum of all respective blocks in each case) may be varied within wide limits, by preference amounting to 100:1 to 1:20.

All the aforementioned and following statements of molecular weight ranges are the number-average molecular weight, unless otherwise indicated.

The block copolymers and/or graft copolymers are obtained by reaction of liquid and/or viscous, branched and/or unbranched polyenes with polymers which can be crosslinked with sulfur only to a limited extent or not at all. The polyenes may have additional functional groups, which are distributed terminally and/or randomly or regularly in the polymer chain. The polymer blocks that can be crosslinked with sulfur only to a limited extent or not at all are essentially saturated polymers. These may also have functional groups such as hydroxyl groups, carboxyl groups, amine groups, vinyl groups, anhydride groups, isocyanate groups, carbonyl groups or epoxy groups. The aforementioned functional groups may be used at least proportionally for synthesis of the block copolymer structures and/or graft copolymer structures, to form the blocks by condensation reactions or addition reactions. However, the block copolymers may also be formed by free-radical reactions. In all cases, it may be necessary to use catalysts or initiators as auxiliaries.

Saturated polymer blocks/thermoplastic blocks not crosslinkable by sulfur in the sense of this invention include, e.g.:

polyolefins with functional terminal groups, e.g., hydroxyl groups, carboxyl groups, anhydride groups, amine groups, vinyl groups, carbonyl groups, isocyanate groups, epoxy groups,

EPDM;

EVA;

polyethers;

polyesters;

polyamides;

polyimides;

polyurethanes;

polystyrene, in particular acrylonitrile-butadiene-styrene copolymers;

isocyanate prepolymers;

polyacrylates with functional terminal groups, e.g., hydroxyl, carboxyl, anhydride, amine, vinyl, carbonyl, isocyanate, etc.;

polyalkylsiloxanes, polyarylsiloxanes, polyalkylarylsiloxanes, with or without the aforementioned functional terminal groups. The viscosities of polysiloxanes are between 200 mPas and 100,000 Pas at 22° C.;

PVC;

thermoplastic polyurethanes (TPU).

The percentage amount of thermoplastic in the copolymer may be up to 80%.

The aforementioned polymer blocks may be linear and/or branched and may also contain additional functional groups of the aforementioned type on the chain terminus or distributed in the polymer chain, if applicable. Mixtures of the aforementioned polymers are also possible.

In addition, the inventive single-component high-temperature-curing reactive compositions contain a vulcanizing system of sulfur and accelerators and/or quinone oximes, if applicable.

A variety of vulcanizing agents in combination with elemental sulfur as well as vulcanizing systems without free sulfur are suitable for the vulcanizing system. The latter include the vulcanizing systems based on thiuram disulfides, organic peroxides, polyfunctional amines, quinones, p-benzoquinone dioxime, p-nitrosobenzene and dinitrosobenzene or also crosslinking with (blocked) diisocyanates. However, vulcanizing systems based on elemental sulfur and organic vulcanizing accelerators as well as zinc compounds are most especially preferred. The powdered sulfur is used in amount from 4 to 25%, based on the total composition; amounts between 7 and 14% are especially preferred for use here. Suitable organic accelerators include dithiocarbamates (in the form of their ammonium salts and/or metal salts), xanthogenates, thiuram compounds (monosulfides and disulfides), thiazole compounds, aldehyde/amine accelerators (e.g., hexamethylenetetramine) as well as guanidine accelerators; dibenzothiazyl disulfide (MBTS), 2-mercapto-benzothiazole (MBT), its zinc salt (ZMBT), zinc dibenzyl dithiocarbamate (ZBEC), N-cyclohexylbenzodithiazylsulfenamide (CBS) or diphenylguanidine. To achieve especially high thermal stability and reversion strength of the adhesive, the vulcanizing mixture may also contain bifunctional crosslinking agents. Specific examples include crosslinking agents based on bifunctional dithiocarbamates, e.g., 1,6-bis(N,N-dibenzylthiocarbamoyl-dithio)hexane.

According to this invention, a combined vulcanizing system of elemental sulfur, the aforementioned organic accelerators and quinone dioximes may also be used. An example is p-benzoquinone dioxime, but other quinone dioximes may also be used in combination with the aforementioned sulfur systems. These organic accelerators are used in amounts between 0.25 and 5.5% by weight, based on the total formulation, by preference between 0.5 and 3% by weight. With the zinc compounds acting as accelerators, a choice may be made among the zinc salts of fatty acids, zinc dithiocarbamates, basic zinc carbonates and in particular finely divided zinc oxide. The zinc compound content is in the range between 0.5 and 10% by weight, by preference between 2 and 8% by weight. In addition, other typical rubber vulcanizing adjuvants, such as fatty acids (e.g., stearic acid) may also be present in the formulation.

In addition, the inventive compositions may also contain the fillers, accelerators, crosslinking agents such as sulfur and/or peroxides, antioxidants, coactivators and other catalysts, carbon blacks, blowing agents, oils, aging protection agents, fibers, if applicable also graphite, rheological adjuvants, adhesion promoters, pigments and thermoplastic polymers customarily used in rubber blends.

The fillers may be selected from a variety of materials, those to be mentioned here including in particular chalks, natural or ground calcium carbonates, calcium magnesium carbonates, silicates, talc, barite and carbon black. It may be expedient for at least a portion of the fillers to be surface pretreated; in particular a coating with stearic acid to reduce the entrained moisture and to reduce the moisture sensitivity of the fully cured composition has proven expedient with the various calcium carbonates and/or chalks. The inventive compositions may also contain between 0 and 8% by weight, by preference between 1 and 6 wt % calcium oxide. The total amount of fillers in the formulation may vary between 10 and 70% by weight, the preferred range being between 20 and 60% by weight.

Conventional stabilizers or aging protection agents, e.g., sterically hindered phenols (for example, 2,2-methylene-bis(4-methyl-6-tert-butylphenol)) or amine derivatives may be used against thermal, thermooxidative or ozone degradation of the inventive compositions, typical quantity ranges for the stabilizers being 0.1 to 2% by weight.

Although the rheology of the inventive compositions may also be brought into the desired range through the choice of fillers and the quantity ratio of the low-molecular liquid rubbers, conventional rheology adjuvants, e.g., pyrogenic silicic acids, bentones or fibrillated or pulp short fibers may also be added in the range between 0.1% and 7% or hydrogenated castor oil derivatives, e.g., known by the brand name Rilanit (Cognis Co.) may be added. Furthermore, other conventional adjuvants and additives may also be used in the inventive compositions.

To achieve blowing during the curing operation, in principle all conventional blowing agents may be used, but organic blowing agents from the class of azo compounds, N-nitroso compounds, sulfonylhydrazides or sulfonylsemicarbazides are preferred. Examples of the azo compounds to be used according to this invention include azobisisobutyronitrile and in particular azodicarbonamide; from the class of nitroso compounds, dinitrosopentamethylenetetramine may be mentioned as an example; from the class of sulfohydrazides, 4,4'-oxybis(benzenesulfonic acid hydrazide), diphenylsulfone-3,3'-disulfohydrazide or benzene-1,3-disulfohydrazide may be mentioned, and from the class of semicarbazides, p-toluenesulfonyl-semicarbazide may be mentioned.

Instead of the aforementioned blowing agents, so-called expandable microspheres may be used, i.e., nonexpanded thermoplastic polymer powders impregnated and/or filled with low-boiling organic liquids. Such microspheres are described in EP-A-559254, EP-A-586541 or EP-A-594598, for example. Although not preferred, microspheres that have already been expanded may also be used and/or jointly used. If applicable, these expandable/expanded microspheres may be combined in any quantity ratio with the aforementioned "chemical" blowing agents. The chemical blowing agents may be used in blowable compositions in amounts between 0.1 and 3% by weight, by preference between 0.2 and 2% by weight, the microspheres being used in amounts between 0.1 and 4% by weight, by preference between 0.2 and 2% by weight.

Although as a rule the inventive compositions already have a very good adhesion to the substrates because of the preferred presence of liquid rubber with functional groups, tackifiers and/or adhesion promoters may be added, if necessary. Suitable examples include hydrocarbon resins, phenolic resins, terpene phenolic resins, resorcinol resins or derivatives thereof, modified or unmodified resinic acids and/or esters (abietic acid derivatives), polyamines, polyaminoamides, anhydrides and copolymers containing anhydride. Addition of polyepoxide resins in small amounts may also improve adhesion with many substrates. However, the solid epoxide resins with a molecular weight of more than 700 are then by preference used for this in finely ground form. If tackifiers and/or adhesion promoters are used, then their type and quantity depend on the polymer composition and the substrate to which the composition is applied. Typical tackifying resins (tackifiers), e.g., terpene phenolic resins or resinic acid derivatives, are used in concentrations between 5 and 20% by weight; typical adhesion promoters such as polyamines, polyaminoamides or phenolic resins or resorcinol derivatives are used in the range between 0.1 and 10% by weight.

The inventive compositions are by preference free of plasticizers and extender oils. However, it may be necessary to influence the rheology of the uncured composition and/or the mechanical properties of the cured composition by adding so-called extender oils, i.e., aliphatic, aromatic or naphthenic oils. However, this influence is by preference accomplished through an expedient choice of the low-molecular liquid rubbers or through joint use of low-molecular polybutenes or polyisobutylenes. If extender oils are used, amounts in the range between 2 and 15 wt % are used.

To obtain high-strength, peel-resistant and impact peel-resistant rubber blends, the inventive compositions by preference contain (amounts given in % by weight):

| Component | General composition | Preferred composition | Especially preferred composition |
|---|---|---|---|
| Solid rubber | 0-18% | 0.5-15% | 1.4-12% |
| Polybutadiene, liquid (MW = 900-10,000 g/mol) | 2-30% | 3-23% | 5-21% |
| Polybutadiene with active carboxyl groups (MW = 1000-10,000 g/mol) | 0-25% | 1-15% | 3-10% |
| Sulfur | 4-25% | 5-15% | 7.5-12% |
| Accelerator | 0.25-8% | 0.4-6.0% | 0.5-3% |
| Bifunctional vulcanizing crosslinker | 0-2% | 0-1% | 0-0.5% |
| Zinc oxide | 0.5-10% | 2-8% | 3-7% |
| Phenolic resin | 0-8% | 0-6% | 0-3% |
| Disodium salt of hexamethylene-1,6-bis(thiosulfate) | 0-2.5% | 0.1-1.8% | 0.4-1.3% |
| Antioxidant | 0-1.5% | 0.1-1.0% | 0.2-0.7% |
| Calcium oxide | 0-8% | 1-6% | 2.5-5.5% |
| Carbon black | 0-4% | 0.1-2% | 0.2-1% |
| Calcium carbonate | 10-45% | 15-40% | 25-35% |
| Calcium carbonate, coated | 0-30% | 5-18% | 3-12% |
| Block copolymer blend | 0.05-70% | 1-40% | 2-25% |

In addition, other fillers such as graphite, talc, silicates, aluminas and fibers and thermoplastic polymers may also be included. The sum of all the components adds up to 100 weight percent in any case.

The inventive high-temperature-curing single-component reactive adhesives may be used in body shop assembly like the adhesives known in the past, e.g., for double-flanged seam bondings or overlapping bondings. They may be applied to oiled sheet metal such as that used in automobile body manufacture. The parts are then joined together. The inventive compositions usually do not require any precuring mechanisms such as induction heating, body shop assembly ovens or IR lamps for precuring because they are scrubber-resistant, like the previously known rubber compositions. In comparison with the previously known rubber compositions, they have a much higher elasticity and are capable of absorbing high energy in the form of impact peel work and/or impact peel energy in the adhesive joint. In particular, the inventive rubber compositions have very good impact peel properties in the cured state even at low temperatures. These properties are desired, so that the structurally bonded components will also comply with modern safety requirements (crash performance) in automobile manufacturing even in the event of an accident.

The inventive compositions may be produced in a known manner in mixing units have a high shearing action. These include, for example, kneaders, planetary mixers, internal mixers, so-called Banbury mixers and similar mixing units with which those skilled in the art are familiar.

In the following exemplary embodiments, the invention will be illustrated in greater detail, but the choice of examples should not constitute a restriction of the scope of the inventive subject matter.

EXAMPLES

Production of block copolymers and/or grafted block copolymers from polyenes with non-sulfur-crosslinkable polymers/thermoplastics:

M1) 800 g maleic anhydride-modified cis-1,4-polybutadiene (MW=2100 g/mol) was mixed with 200 g of a polyolefin polyol (Mn=3500 g/mol) in a reaction vessel. While stirring and heating to 85° C., the reaction mixture was allowed to react and was then cooled. An opaque, viscous mixture of a block copolyester was obtained.

M2) 800 g maleic anhydride-modified cis-1,4-polybutadiene (MW=2100 g/mol) was mixed with 200 g of a polyolefin polyol (Mn=3500 g/mol) in a reaction vessel with the addition of 0.04% K isooctoate. While stirring, the reaction mixture was heated to 85° C. and allowed to react. Then it was cooled, yielding an opaque, viscous mixture of a block copolyester.

S1) 500 g cis-1,4-polybutadiene (Mn=5000 g/mol) was mixed with 50 g of a linear vinyl-terminated polydimethylsiloxane (viscosity=1000 mPas, vinyl content approx. 0.13 mmol/g, Mn≈5200) in a reaction vessel. While stirring, 0.1% of a suitable peroxide was added and the mixture was heated for 30 minutes at 170° C. under a nitrogen atmosphere. An opaque, viscous mixture of a block copolymer was obtained.

S2) 300 g cis-1,4-polybutadiene (Mn=5000 g/mol) was mixed with 100 g of a linear vinyl-terminated polydimethylsiloxane (viscosity=1000 mPas, vinyl content approx. 0.13 mmol/g, Mn≈5200) in a reaction vessel. While stirring, 0.1% of a suitable peroxide was added and the mixture was heated for 30 minutes at 170° C. under a nitrogen atmosphere. An opaque, viscous mixture of a block copolymer was obtained.

S3) 500 g cis-1,4-polybutadiene (Mn=5000 g/mol) was mixed with 50 g of a linear vinyl-terminated polydimethylsiloxane (viscosity=200 mPas, vinyl content approx. 0.3 mmol/g, Mn≈3300) in a reaction vessel. While stirring, 0.1% of a suitable peroxide was added and the mixture was heated for 30 minutes at 170° C. under a nitrogen atmosphere. An opaque, viscous mixture of a block copolymer was obtained.

S4) 500 g cis-1,4-polybutadiene (Mn=5000 g/mol) was mixed with 50 g of a linear vinyl-terminated polydimethylsiloxane (viscosity=10 Pas, vinyl content approx. 0.3 mmol/g, Mn≈37,000) in a reaction vessel. While stirring, 0.1% of a suitable peroxide was added and the mixture was heated for 30 minutes at 170° C. under a nitrogen atmosphere. An opaque, viscous mixture of a block copolymer was obtained.

S5) 500 g cis-1,4-polybutadiene (Mn=5000 g/mol) was mixed with 50 g of a linear vinyl-terminated polydimethylsiloxane (viscosity=165 Pas, vinyl content approx. 0.3 mmol/g, Mn≈90,000) in a reaction vessel. While stirring, 0.1% of a suitable peroxide was added and the mixture was heated for 30 minutes at 170° C. under a nitrogen atmosphere. An opaque, viscous mixture of a block copolymer was obtained.

S6) 500 g cis-1,4-polybutadiene (Mn=5000 g/mol) was mixed with 50 g of a linear vinyl-terminated polydimethylsiloxane with vinyl side groups (viscosity=1000 mPas, vinyl content approx. 0.3 mmol/g, Mn≈5500) in a reaction vessel. While stirring, 0.1% of a suitable peroxide was added and the mixture was heated for 30 minutes at 170° C. under a nitrogen atmosphere. An opaque, viscous mixture of a block copolymer was obtained.

S7) 500 g cis-1,4-polybutadiene (Mn=5000 g/mol) was mixed with 50 g of a linear vinyl-terminated polydimethylsiloxane with vinyl side groups (viscosity=10 Pas, vinyl content approx. 0.3 mmol/g, Mn≈37,800) in a reaction vessel. While stirring, 0.1% of a suitable peroxide was added and the mixture was heated for 30 minutes at 170° C. under a nitrogen atmosphere. An opaque, viscous mixture of a block copolymer was obtained.

S8) 500 g cis-1,4-polybutadiene (Mn=9000 g/mol) was mixed with 50 g of a linear vinyl-terminated polydimethylsiloxane (viscosity=165 Pas, vinyl content approx. 0.3 mmol/g, Mn≈90,000) in a reaction vessel. While stirring, 0.1% of a suitable peroxide was added and the mixture was heated for 30 minutes at 170° C. under a nitrogen atmosphere. An opaque, viscous mixture of a block copolymer was obtained.

Examples 1 to 17

Adhesive Compositions

Example 1

Comparison

| | |
|---|---|
| Polybutadiene cis-1,4- (solid) | 2.80 |
| Calcium oxide | 2.50 |
| 2,2-Methylene-bis(4-methyl-6-tert-butylphenol) | 0.50 |
| Carbon black | 0.50 |
| Zinc oxide | 3.00 |
| Precipitated calcium carbonate | 20.00 |
| Polybutadiene oil (MW = 1800), vinyl 50% | 19.00 |
| Stereospecific polybutadiene oil (MW = 1800), vinyl 50% | 7.55 |
| Sulfur | 6.50 |
| ZMBT | 2.50 |
| Polybutadiene with active carboxyl groups (MW = 2100) | 10.00 |
| Calcium carbonate, coated with stearate | 15.00 |
| MBTS | 0.95 |
| Disodium salt of hexamethylene-1,6-bis(thiosulfate) | 0.50 |
| Microspheres | 0.20 |
| Polyvinyl acetate, EVA copolymer, $T_g$ approx. 40° C. | 8.50 |

Example 2

Comparison, Free Polydimethylsiloxane in the Rubber Blend

| | |
|---|---|
| Polybutadiene cis-1,4- (solid) | 11.3 |
| Calcium oxide | 4.20 |
| 2,2-Methylene-bis(4-methyl-6-tert-butylphenol) | 0.50 |
| Carbon black | 0.50 |
| Zinc oxide | 4.00 |
| Precipitated calcium carbonate | 31.3 |
| Calcium carbonate, coated with stearate | 6.65 |
| Low-molecular polybutadiene oil (MW = 5000), vinyl 15% | 20.0 |
| MBTS | 0.95 |
| Sulfur | 10.00 |
| Bifunctional crosslinking agent[1] for vulcanization | 0.15 |
| Disodium salt of hexamethylene-1,6-bis(thiosulfate) | 0.95 |
| Phenolic resin | 2.50 |
| Polybutadiene with active carboxyl groups (MW = 2100) | 5.00 |
| Polydimethylsiloxane (Mn = 90,000 g/mol) | 2.00 |

Example 3

Inventive

| | |
|---|---|
| Polybutadiene cis-1,4- (solid) | 5.84 |
| Calcium oxide | 4.20 |
| 2,2-Methylene-bis(4-methyl-6-tert-butylphenol) | 0.50 |
| Carbon black | 0.50 |
| Zinc oxide | 4.00 |
| Precipitated calcium carbonate | 31.37 |
| Calcium carbonate, coated with stearate | 10.60 |
| Low-molecular polybutadiene oil (MW = 5000), vinyl 15% | 21.54 |
| MBTS | 0.95 |
| Sulfur | 7.05 |
| Disodium salt of hexamethylene-1,6-bis(thiosulfate) | 0.95 |
| Phenolic resin | 2.50 |
| Polybutadiene with active carboxyl groups (MW = 2100) | 4.00 |
| Copolymer M1 | 6.00 |

Example 4

Inventive

| | |
|---|---|
| Polybutadiene cis-1,4- (solid) | 5.84 |
| Calcium oxide | 4.20 |
| 2,2-Methylene-bis(4-methyl-6-tert-butylphenol) | 0.50 |
| Carbon black | 0.50 |
| Zinc oxide | 4.00 |
| Precipitated calcium carbonate | 31.37 |
| Calcium carbonate, coated with stearate | 10.60 |
| Low-molecular polybutadiene oil (MW = 5000), vinyl 15% | 21.54 |
| MBTS | 0.95 |
| Sulfur | 8.50 |
| Disodium salt of hexamethylene-1,6-bis(thiosulfate) | 0.50 |
| Phenolic resin | 2.50 |
| Polybutadiene with active carboxyl groups (MW = 2100) | 4.00 |
| Copolymer M2 | 5.00 |

Example 5

Inventive

| | |
|---|---|
| Polybutadiene cis-1,4- (solid) | 5.84 |
| Calcium oxide | 4.20 |
| 2,2-Methylene-bis(4-methyl-6-tert-butylphenol) | 0.50 |
| Carbon black | 0.50 |
| Zinc oxide | 4.00 |
| Precipitated calcium carbonate | 31.37 |
| Calcium carbonate, coated with stearate | 9.15 |
| Low-molecular polybutadiene oil (MW = 5000), vinyl 15% | 11.54 |

-continued

| | |
|---|---|
| MBTS | 0.95 |
| Sulfur | 7.50 |
| Disodium salt of hexamethylene-1,6-bis(thiosulfate) | 0.95 |
| Phenolic resin | 2.50 |
| Polybutadiene with active carboxyl groups (MW = 2100) | 5.00 |
| Copolymer S1 | 16.00 |

Example 6

Inventive

| | |
|---|---|
| Polybutadiene cis-1,4- (solid) | 5.84 |
| Calcium oxide | 4.20 |
| 2,2-Methylene-bis(4-methyl-6-tert-butylphenol) | 0.50 |
| Carbon black | 0.50 |
| Zinc oxide | 4.00 |
| Precipitated calcium carbonate | 29.87 |
| Calcium carbonate, coated with stearate | 9.15 |
| Low-molecular polybutadiene oil (MW = 5000), vinyl 15% | 6.04 |
| MBTS | 0.95 |
| Sulfur | 9.00 |
| Disodium salt of hexamethylene-1,6-bis(thiosulfate) | 0.95 |
| Phenolic resin | 2.50 |
| Polybutadiene with active carboxyl groups (MW = 2100) | 5.00 |
| Copolymer S1 | 16.00 |

Example 7

Inventive

| | |
|---|---|
| Polybutadiene cis-1,4- (solid) | 11.34 |
| Calcium oxide | 4.20 |
| 2,2-Methylene-bis(4-methyl-6-tert-butylphenol) | 0.50 |
| Carbon black | 0.50 |
| Zinc oxide | 4.00 |
| Precipitated calcium carbonate | 31.37 |
| Calcium carbonate, coated with stearate | 9.15 |
| Low-molecular polybutadiene oil (MW = 5000), vinyl 15% | 6.04 |
| MBTS | 0.95 |
| Sulfur | 7.50 |
| Disodium salt of hexamethylene-1,6-bis(thiosulfate) | 0.95 |
| Phenolic resin | 2.50 |
| Polybutadiene with active carboxyl groups (MW = 2100) | 5.00 |
| Copolymer S1 | 16.00 |

Example 8

Inventive

| | |
|---|---|
| Polybutadiene cis-1,4- (solid) | 5.84 |
| Calcium oxide | 4.20 |
| 2,2-Methylene-bis(4-methyl-6-tert-butylphenol) | 0.50 |
| Carbon black | 0.50 |
| Zinc oxide | 4.00 |
| Precipitated calcium carbonate | 31.37 |
| Calcium carbonate, coated with stearate | 9.15 |
| Low-molecular polybutadiene oil (MW = 5000), vinyl 15% | 23.34 |
| MBTS | 0.95 |
| Sulfur | 7.50 |
| Disodium salt of hexamethylene-1,6-bis(thiosulfate) | 0.95 |
| Phenolic resin | 2.50 |

-continued

| | |
|---|---|
| Polybutadiene with active carboxyl groups (MW = 2100) | 5.00 |
| Copolymer S2 | 4.20 |

Example 9

Inventive

| | |
|---|---|
| Polybutadiene cis-1,4- (solid) | 5.84 |
| Calcium oxide | 4.20 |
| 2,2-Methylene-bis(4-methyl-6-tert-butylphenol) | 0.50 |
| Carbon black | 0.50 |
| Zinc oxide | 4.00 |
| Precipitated calcium carbonate | 27.78 |
| Calcium carbonate, coated with stearate | 9.15 |
| Low-molecular polybutadiene oil (MW = 5000), vinyl 15% | 7.54 |
| MBTS | 0.95 |
| Sulfur | 10.00 |
| Disodium salt of hexamethylene-1,6-bis(thiosulfate) | 0.95 |
| Phenolic resin | 2.50 |
| Polybutadiene with active carboxyl groups (MW = 2100) | 5.00 |
| Copolymer S4 | 21.00 |

Example 10

Inventive

| | |
|---|---|
| Polybutadiene cis-1,4- (solid) | 11.34 |
| Calcium oxide | 4.20 |
| 2,2-Methylene-bis(4-methyl-6-tert-butylphenol) | 0.50 |
| Carbon black | 0.50 |
| Zinc oxide | 4.00 |
| Precipitated calcium carbonate | 31.37 |
| Calcium carbonate, coated with stearate | 9.15 |
| Low-molecular polybutadiene oil (MW = 5000), vinyl 15% | 14.54 |
| MBTS | 0.95 |
| Sulfur | 10.00 |
| Disodium salt of hexamethylene-1,6-bis(thiosulfate) | 0.95 |
| Phenolic resin | 2.50 |
| Polybutadiene with active carboxyl groups (MW = 2100) | 5.00 |
| Copolymer S2 | 5.00 |

Example 11

Inventive

| | |
|---|---|
| Polybutadiene cis-1,4- (solid) | 11.34 |
| Calcium oxide | 4.20 |
| 2,2-Methylene-bis(4-methyl-6-tert-butylphenol) | 0.50 |
| Carbon black | 0.50 |
| Zinc oxide | 4.00 |
| Precipitated calcium carbonate | 31.37 |
| Calcium carbonate, coated with stearate | 6.65 |
| Low-molecular polybutadiene oil (MW = 5000), vinyl 15% | 6.04 |
| MBTS | 0.95 |
| Sulfur | 10.00 |
| Disodium salt of hexamethylene-1,6-bis(thiosulfate) | 0.95 |
| Phenolic resin | 2.50 |
| Polybutadiene with active carboxyl groups (MW = 2100) | 5.00 |
| Copolymer S5 | 16.00 |

Example 12

Inventive

| | |
|---|---|
| Polybutadiene cis-1,4- (solid) | 11.34 |
| Calcium oxide | 4.20 |
| 2,2-Methylene-bis(4-methyl-6-tert-butylphenol) | 0.50 |
| Carbon black | 0.50 |
| Zinc oxide | 4.00 |
| Precipitated calcium carbonate | 31.37 |
| Calcium carbonate, coated with stearate | 6.65 |
| Low-molecular polybutadiene oil (MW = 5000), vinyl 15% | 6.04 |
| MBTS | 0.95 |
| Sulfur | 10.00 |
| Disodium salt of hexamethylene-1,6-bis(thiosulfate) | 0.95 |
| Phenolic resin | 2.50 |
| Polybutadiene with active carboxyl groups (MW = 2100) | 5.00 |
| Copolymer S6 | 16.00 |

Example 13

Inventive

| | |
|---|---|
| Polybutadiene cis-1,4- (solid) | 11.34 |
| Calcium oxide | 4.20 |
| 2,2-Methylene-bis(4-methyl-6-tert-butylphenol) | 0.50 |
| Carbon black | 0.50 |
| Zinc oxide | 4.00 |
| Precipitated calcium carbonate | 31.37 |
| Calcium carbonate, coated with stearate | 6.65 |
| Low-molecular polybutadiene oil (MW = 5000), vinyl 15% | 6.04 |
| MBTS | 0.95 |
| Sulfur | 10.00 |
| Disodium salt of hexamethylene-1,6-bis(thiosulfate) | 0.95 |
| Phenolic resin | 2.50 |
| Polybutadiene with active carboxyl groups (MW = 2100) | 5.00 |
| Copolymer S7 | 16.00 |

Example 14

Inventive

| | |
|---|---|
| Polybutadiene cis-1,4- (solid) | 11.34 |
| Calcium oxide | 4.20 |
| 2,2-Methylene-bis(4-methyl-6-tert-butylphenol) | 0.50 |
| Carbon black | 0.50 |
| Zinc oxide | 4.00 |
| Precipitated calcium carbonate | 31.37 |
| Calcium carbonate, coated with stearate | 6.65 |
| Low-molecular polybutadiene oil (MW = 5000), vinyl 15% | 6.04 |
| MBTS | 0.95 |
| Sulfur | 10.00 |
| Disodium salt of hexamethylene-1,6-bis(thiosulfate) | 0.95 |
| Phenolic resin | 2.50 |
| Polybutadiene with active carboxyl groups (MW = 2100) | 5.00 |
| Copolymer S5 | 8.00 |
| Copolymer S6 | 8.00 |

Example 15

Inventive

| | |
|---|---|
| Polybutadiene cis-1,4- (solid) | 11.34 |
| Calcium oxide | 4.20 |
| 2,2-Methylene-bis(4-methyl-6-tert-butylphenol) | 0.50 |
| Carbon black | 0.50 |
| Zinc oxide | 4.00 |
| Precipitated calcium carbonate | 31.22 |
| Calcium carbonate, coated with stearate | 6.65 |
| Low-molecular polybutadiene oil (MW = 5000), vinyl 15% | 6.04 |
| MBTS | 0.95 |
| Sulfur | 10.00 |
| Bifunctional crosslinking agent[1] for vulcanization | 0.15 |
| Disodium salt of hexamethylene-1,6-bis(thiosulfate) | 0.95 |
| Phenolic resin | 2.50 |
| Polybutadiene with active carboxyl groups (MW = 2100) | 5.00 |
| Copolymer S8 | 16.00 |

Example 16

Inventive

| | |
|---|---|
| Polybutadiene cis-1,4- (solid) | 11.34 |
| Calcium oxide | 4.20 |
| 2,2-Methylene-bis(4-methyl-6-tert-butylphenol) | 0.50 |
| Carbon black | 0.50 |
| Zinc oxide | 4.00 |
| Precipitated calcium carbonate | 30.12 |
| Calcium carbonate, coated with stearate | 6.65 |
| Low-molecular polybutadiene oil (MW = 5000), vinyl 15% | 6.04 |
| MBTS | 0.95 |
| Sulfur | 11.00 |
| Bifunctional crosslinking agent[1] for vulcanization | 0.25 |
| Disodium salt of hexamethylene-1,6-bis(thiosulfate) | 0.95 |
| Phenolic resin | 2.50 |
| Polybutadiene with active carboxyl groups (MW = 2100) | 5.00 |
| Copolymer S6 | 22.04 |

Example 17

Inventive

| | |
|---|---|
| Polybutadiene cis-1,4- (solid) | 2.8 |
| Calcium oxide | 4.20 |
| 2,2-Methylene-bis(4-methyl-6-tert-butylphenol) | 0.50 |
| Carbon black | 0.50 |
| Zinc oxide | 4.00 |
| Precipitated calcium carbonate | 31.22 |
| Calcium carbonate, coated with stearate | 6.65 |
| Low-molecular polybutadiene oil (MW = 5000), vinyl 15% | 6.83 |
| MBTS | 1.2 |
| Sulfur | 11.50 |
| Bifunctional crosslinking agent[1] for vulcanization | 0.15 |
| Disodium salt of hexamethylene-1,6-bis(thiosulfate) | 0.95 |
| Phenolic resin | 2.50 |
| Polybutadiene with active carboxyl groups (MW = 2100) | 8.00 |
| Polybutadiene-polydimethylsiloxane copolymer (Wacker Chemie) | 19.0 |

[1] 1,6-bis(N,N-dibenzylthiocarbamoyldithio)hexane

With the rubber compositions of Examples 1 to 17 described above, test objects were prepared from steel plate for determination of the tensile shear strength and the impact peel strength (impact peel energy). The test objects were fully cured for 25 minutes at 175° C. in a recirculating air drying cabinet to cure the adhesive mixture. The measurement results for the tensile shear strength at room temperature and for the impact peel energy according to ISO 11343 at room temperature, −20° C. and −40° C. are listed in Table 1.

TABLE 1

| Example | Tensile shear strength (MPa) 25 × 12.5 × 0.2 mm | Impact peel energy, RT (ISO 11343) | Impact peel energy, −20° C. (ISO 11343) | Impact peel energy, −40° C. (ISO 11343) |
|---|---|---|---|---|
| 1 (comparison) | 16.2 MPa | ~3 J | ~1.5 J | ~1.0 J |
| 2 (comparison) | 16.1 MPa | 18.3 J | 4.2 J | 0.8 J |
| 3 | 12.5 MPa | 12.5 J | 14 J | 2.2 J |
| 4 | 16.8 MPa | 27.0 J | 5.9 J | 3.2 J |
| 5 | 14.1 MPa | 23.0 J | 26.0 J | 9.0 J |
| 6 | 15.9 MPa | 19.3 J | 15.7 J | 8.7 J |
| 7 | 13.2 MPa | 20.3 J | 24.3 J | 13.8 J |
| 8 | 12.7 MPa | 19.0 J | 24.2 J | 14.9 J |
| 9 | 15.8 MPa | 18.1 J | 5.6 J | 4.1 J |
| 10 | 17.8 MPa | 18.1 J | 7.9 J | 5.1 J |
| 11 | 18.6 MPa | 24.8 J | 14.6 J | 11.2 J |
| 12 | 17.4 MPa | 23.1 J | 17.5 J | 10.6 J |
| 13 | 18.3 MPa | 22.1 J | 18.2 J | 7.9 J |
| 14 | 20.1 MPa | 28.7 J | 12.2 J | 6.2 J |
| 15 | 17.1 MPa | 23.9 J | 11.5 J | 4.7 J |
| 16 | 22.1 MPa | 24.1 J | 9.6 J | 4.4 J |
| 17 | 23.3 MPa | 20.7 J | 10.5 J | 9.0 J |

It is clear from the tensile shear strength and the impact peel energy values in Table 1 that the inventive adhesive compositions ensure high tensile shear strength as well as impact peel energy values in particular at low temperatures such as −20° C. or −40° C., in comparison with comparable rubber compositions from the state of the art.

What is claimed is:

1. A single-component high-temperature-curing reactive composition comprising:
  (a) at least one liquid polyene with a number average molecular weight between 400 and 80,000 present in an amount of from 2 to 55% by weight based on the total weight of said composition;
  (b) at least one block copolymer with at least one polyene block having a number average molecular weight of from 800 to 15,000 and at least one saturated block having a number average molecular weight of from 500 to 90,000, said at least one block copolymer present in an amount of from 0.05 to 70% by weight based on the total weight of said composition;
  (c) at least one solid rubber having a number average molecular weight of at least 100,000; and
  (d) a cure system consisting essentially of a vulcanizing system comprising sulfur and at least one vulcanizing accelerator, wherein said cure system cures both said liquid polyene and said block copolymer.

2. The composition according to claim 1, wherein the saturated block of the block copolymer b) has a glass transition temperature of less than −30° C.

3. The composition according to claim 1, wherein the saturated block of the block copolymer b) comprises EPDM, EVA, polyether, polyester, polyamide, polyimide, polyurethane, polyacrylate, polystyrene copolymer units or units based on hydrogenated acrylonitrile-butadiene-styrene copolymer.

4. The composition according to claim 1, wherein the saturated block of the block copolymer b) comprises polyoxyalkylene, polydialkylsiloxane, polydiarylsiloxane, polyalkylarylsiloxane, polyether-modified polydimethylsiloxane, poly(ethylene-propylene), poly(ethylene-butylene), polyisobutylene, SEPS (styrene-ethylene -propylene-styrene), SEEPS (styrene-ethylene-ethylene-propylene-styrene) or SEBS (styrene -ethylene-butylene-styrene) copolymer.

5. The composition according to claim 1, wherein the polyene block of the block copolymer b) comprises polybutadiene, polyisoprene, butyl rubber units as well as copolymer units of butadiene and/or isoprene with styrene and/or acrylonitrile, or copolymer units of acrylic acid esters with dienes.

6. The composition according to claim 1, wherein the block polymer b) is prepared by reacting a maleic anhydride-modified polybutadiene with a member selected from the group consisting polydialkylsiloxanes with terminal hydroxyl or amino groups, polydiarylsiloxanes with terminal hydroxyl or amino groups, polyalkylarylsiloxane with terminal hydroxyl or amino groups, polyoxyalkylenediols, and OH-terminated polyolefins.

7. The composition according to claim 1, wherein the block copolymer b) is prepared by reacting a polybutadiene with a polydialkylsiloxane, polydiarylsiloxane or polyalkylarylsiloxane containing terminal and/or side chain vinyl groups and/or acrylate groups.

8. The composition according to at claim 1, additionally comprising at least one solid rubber selected from the group consisting of cis-1,4-polybutadienes, styrene-butadiene rubbers, synthetic isoprene rubbers, natural rubbers, ethylene-propylenediene rubbers (EPDM), nitrile rubbers, butyl rubbers, acrylic rubbers and polychloroprenes.

9. The composition according to claim 1, additionally comprising at least one thermoplastic polymer powder.

10. The composition according to claim 1, wherein the vulcanizing system comprises sulfur, one or more organic vulcanizing accelerators and one or more zinc compounds.

11. The composition according to claim 10, wherein the vulcanizing system comprises 4 wt. % to 25 wt. % powdered sulfur, 0.25 wt. % to 8 wt. % organic accelerator(s) and 0.5 wt. % to 10 wt. % zinc compound(s), the wt. % being based on total amount of said reactive composition.

12. The composition according to claim 1, additionally comprising at least one member selected from the group consisting of fillers, rheology adjuvants, extender oils, blowing agents, pigments, adhesion promoters and aging protection agents.

13. The composition according to claim 1, wherein said at least one liquid polyene has a number average molecular weight between 800 and 25,000.

14. The composition according to claim 1, wherein the polyene block of the block copolymer b) has a number average molecular weight between 1200 and 9000.

15. The composition according to claim 1, wherein the saturated block of the block copolymer b) has a number average molecular weight between 1000 and 40,000.

16. The composition according to claim 1, wherein the vulcanizing system comprises 5 wt. % to 15 wt. % powdered sulfur, 0.4 wt. % to 6 wt. % organic accelerator(s) and 1 wt. % to 8 wt. % zinc compound(s), the wt. % being based on total amount of said reactive composition.

17. A single-component high-temperature-curing reactive composition comprising 0.5 to 15 weight % of at least one solid rubber having a number average molecular weight of at least 100,000, 2 to 30 weight % liquid polybutadiene having a number average molecular weight of 900 to 10,000, 0 to 25 weight % of polybutadiene with active carboxyl groups and having a number average molecular weight of 1040 to 10,000, 4 to 25 weight % sulfur, 0.25 to 8 weight % of at least one vulcanizing accelerator, 0 to 2 weight % bifunctional vulcanizing crosslinker, 0.5 to 10 weight % zinc oxide, 0 to 8 weight % of at least one phenolic resin, 0 to 2.5 weight % of disodiurn salt of hexamethylene-1,6-bis(thiosulfate), 0 to 1.5 weight % of at least one antioxidant, 0 to 8 weight % calcium oxide, 0 to 4 weight % carbon black, 10 to 45 weight % calcium carbonate, 5 to 18 weight % coated calcium carbonate, and 0.05 to 70 weight % of at least one block copolymer with at least one polyene block having a number average molecular weight of from 800 to 15,000 and at least one saturated block having a number average molecular weight of from 500 to 90,000, wherein both said liquid polybutadiene and said block copolymer are cured in said composition exclusively by a vulcanization reaction with at least said sulfur and said vulcanizing accelerator.

18. A method of manufacturing an automobile body using an adhesive, sealant or coating compound, said method comprising using the single-component high-temperature-curing reactive composition according to claim 1 as the adhesive, sealant or coating compound.

* * * * *